(12) United States Patent
Xavier et al.

(10) Patent No.: US 7,991,750 B1
(45) Date of Patent: Aug. 2, 2011

(54) APPLICATION RECOVERY FROM NETWORK-INDUCED DATA CORRUPTION

(75) Inventors: Felix Xavier, Karnataka (IN); Kevin Varghese, Karnataka (IN); Tijin George, Karnataka (IN); Jayalakshmi Pattabiraman, Karnataka (IN)

(73) Assignee: Network Appliance, Inc., Sunnyvale, CA (US)

( * ) Notice: Subject to any disclaimer, the term of this patent is extended or adjusted under 35 U.S.C. 154(b) by 453 days.

(21) Appl. No.: 12/136,214

(22) Filed: Jun. 10, 2008

(51) Int. Cl.
*G06F 17/30* (2006.01)

(52) U.S. Cl. ........ 707/690; 707/691; 707/697; 707/699; 714/758; 714/750; 714/748; 714/48; 709/251

(58) Field of Classification Search .................. 707/690, 707/691, 697, 699; 714/758, 751, 750, 749, 714/748, 776, 791, 49, 48; 709/251
See application file for complete search history.

(56) References Cited

U.S. PATENT DOCUMENTS

| | | | | |
|---|---|---|---|---|
| 5,235,680 A | * | 8/1993 | Bijnagte | 1/1 |
| 5,687,314 A | * | 11/1997 | Osman et al. | 714/49 |
| 7,394,769 B2 | * | 7/2008 | Banerjee et al. | 370/252 |
| 7,562,278 B2 | * | 7/2009 | Lyakh et al. | 714/751 |
| 2003/0097481 A1 | * | 5/2003 | Richter | 709/251 |
| 2005/0036452 A1 | * | 2/2005 | Banerjee et al. | 370/252 |
| 2007/0157069 A1 | * | 7/2007 | Lyakh et al. | 714/791 |

* cited by examiner

*Primary Examiner* — Jean M Corrielus
(74) *Attorney, Agent, or Firm* — Leon S. Erikson; John R. Ley

(57) ABSTRACT

A source application reads a body of data in data block sized units and calculates a checksum value for each data block before sending the data block, the calculated checksum value and the identifier. Upon receipt, a destination application independently calculates a checksum value for each received data block and compares the two checksums. Non-matching checksums indicate a network-induced error in the data block. Identifiers for the erroneous data blocks are transmitted to the source application after all of the data blocks have been initially transmitted. The source application thereafter resends only those data blocks identified. The destination application repeats the process of comparing checksums and transmitting identifiers to the source application until all of the data blocks of the body of data have been correctly received, and then uses the data blocks to recreate the body of data.

19 Claims, 7 Drawing Sheets

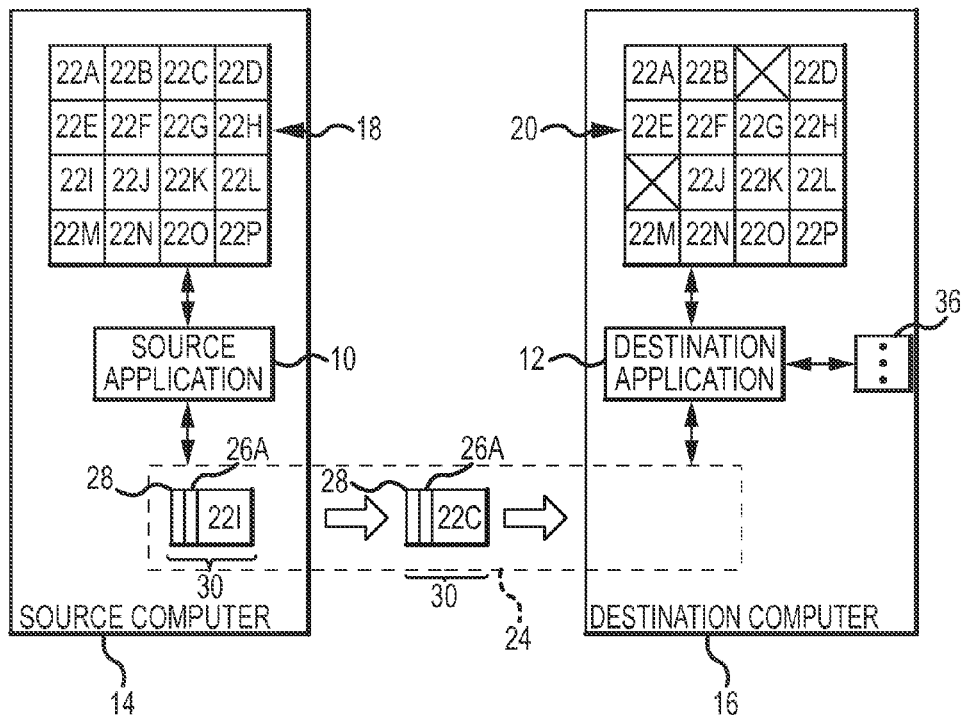
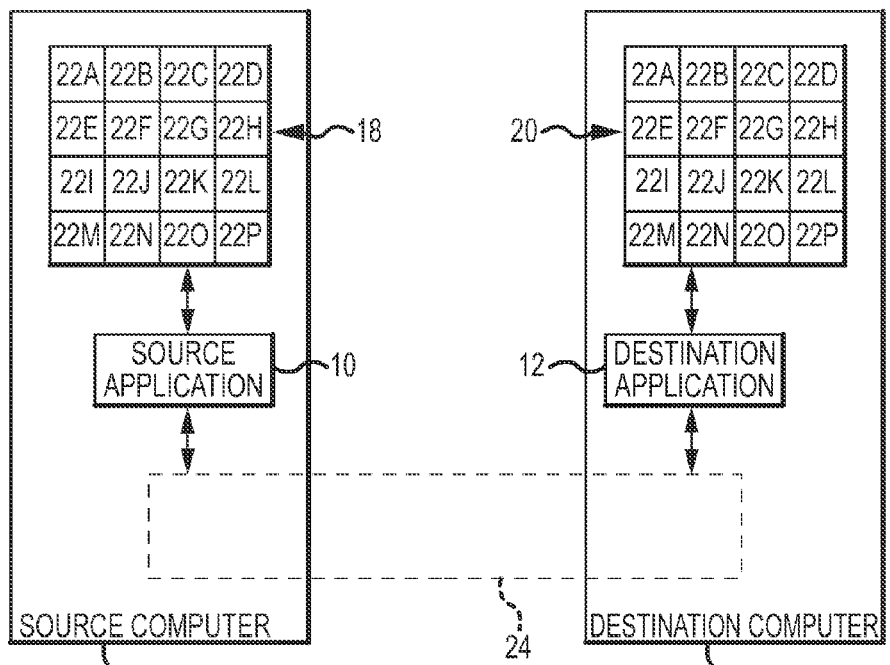

APPLICATION RECOVERY FROM NETWORK-INDUCED DATA CORRUPTION

This invention relates to computer communications, and more particularly those communications using a communications protocol which includes error detection, such as the well-known Transmission Control Protocol/Internet Protocol (TCP/IP). Even more particularly, the present invention relates to computer application error detection to identify, and error correction to recover from, network-induced errors in data transmission that were not detected by the communication protocol, and doing so in a manner which facilitates more efficient data processing by computer applications.

BACKGROUND OF THE INVENTION

Computers store and transmit data in binary form, in which the data is represented by a series of bits. Computers communicate by sending and receiving ordered groups of bits known as packets. Packets are transmitted between computers over one or more networks.

Networks are often subject to signal noise and signal interference from various and oftentimes spurious sources. The noise and interference can cause one or more of the bits in a packet to change states as the packet traverses the network. Of course, changing one or more of the bits introduces an error in the data intended to be transferred. To guard against such errors, various error checking and protocol techniques have been developed to detect and correct errors introduced by communications between computers.

A common technique for detecting errors in packets is the use of a checksum. A checksum is a binary arithmetic sum of fixed size collections of bits, or words, which make up a particular instance of data. A checksum is typically applied with respect to each packet, but can also be applied to an entire data block formed by many packets. A source computer calculates a checksum of the packets of the data block and includes the checksum as a part of the data block sent to a destination computer. Upon receipt of the data block, the destination computer independently calculates a checksum of the packets of the data block using the same checksum calculation algorithm that the source computer used to calculate the first instance of the checksum. The destination computer then compares the calculated checksum to the transmitted checksum included in the transmitted data block. If the two checksums match, then the data received is assumed to be an accurate copy of the data sent.

While normally very effective, checksums are not entirely reliable in detecting errors, particularly packet errors involving multiple words. Communication errors can lead to certain types of data errors, such as offset errors or word interchanges, which sometimes go undetected by a checksum. An offset error occurs when a destination device for a packet, such as a router or the destination computer, mistakes the start of a data block transmission and adds or subtracts an additional word at the start of the received packet. A checksum may easily miss an offset error if the packet contains many repeated characters. For example, and assuming a word size of four bits for ease of explanation, a data block having one thousand words with bit patterns of "0000" and four words with bit patterns of "0011" in the center of the data block has a binary checksum of "1100." If the bits of the center four words are changed due to an offset error, the checksum calculated by the destination computer will match the transmitted checksum from the source computer even though the data block received at the destination computer is different from the data block sent by the source computer.

Computer applications ("applications") which execute functions based on data typically rely on a transport protocol to communicate data with other applications on other computers which might also be executing the same or related functions. Simplistically stated, a transport protocol is a set of rules used by the sending or source and receiving or destination computers which identify the data and separate it from other information that may be included with each data block, such as the checksum. Transmission Control Protocol (TCP) is the predominantly used transport protocol for Internet communications and is regarded as a reliable transport protocol. TCP uses a checksum to detect errors incurred during the transmission.

Since TCP is assumed to be a reliable transport protocol, applications that use TCP for communication of data rarely, if at all, incorporate their own error detection and correction mechanisms. Instead such applications rely on the error detection and correction capability of TCP. In those cases where TCP does not detect an error in one of many recently transmitted packets which together contain the data of, for example, a file, the entire file must typically be retransmitted before the application can use the file, even though the error may afflict only a very small portion of the entire file. Retransmitting an entire file or other data structure can be very time consuming, particularly when the file is relatively large or transmitted over a slow network or from a slow computer.

SUMMARY OF THE INVENTION

The present invention allows a destination computer application ("destination application") to detect erroneous data which was corrupted during transfer from a source computer application ("source application") which a transport protocol failed to detect, and to request that the source application retransmit only those portions of larger data blocks or data structure which contained the corrupted data. The source application transmits all of the data blocks which form the entire data structure in an initial data transfer before resending any data blocks determined to contain corrupted data, thus maximizing the performance benefit of sequentially reading the data structure from storage media of the source computer. Among other benefits, the source application does not have to maintain logs of the data sent, does not need to buffer the data it sends, does not need to maintain timers for retransmission of data which has not been acknowledged, and does not incur additional processing overhead when there are no corrupted data blocks. The destination computer may process the data more effectively to achieve a higher data throughput, because less time is consumed in accurately transferring the data.

In accordance with these and other features, one aspect of the invention relates to a computer system comprising a source application and a destination application running on computers connected by a network. The source application reads a body of data, one data block at a time, calculates a checksum for each data block and assigns an identifier to each data block. The source application sends to the destination application all of the data blocks and associated identifiers and checksums in an initial data transfer. The destination application receives the initial data transfer, calculates a checksum for each data block, and compares the calculated checksum with the checksum received with each data block. At the end of the initial data transfer, the destination application requests the source application resend any data blocks whose checksums did not match, by sending the source application a list of identifiers for those data blocks whose checksums did not compare identically. The source application then resends only the data blocks identified in the resend request. This procedure iterates until the entire body of data is accurately transferred.

Another aspect of the present invention involves or relates to a method of correcting errors in data communications between a source application and a destination application. The source application reads a body of data, one data block at a time, calculates a checksum for each data block, associates an identifier with each data block, and sends all of the data blocks, identifiers and checksums to the destination application in an initial transfer. The destination application calculates a checksum for each data block, compares the checksum calculated by the source application to the checksum calculated by the destination application for each data block, and requests the source application resend data blocks with checksums which do not match. The source application resends to the destination application any data blocks identified in the request to resend. This procedure iterates until the entire body of data is accurately transferred.

Other aspects of the invention, and a more complete appreciation of the present invention, as well as the manner in which the present invention achieves the above and other improvements, can be obtained by reference to the following detailed description of a presently preferred embodiment taken in connection with the accompanying drawings, which are briefly summarized below, and by reference to the appended claims.

BRIEF DESCRIPTION OF THE DRAWINGS

FIGS. 1-5 are block diagrams which graphically represent different events in a process which embodies the present invention.

DETAILED DESCRIPTION

Figure 1:
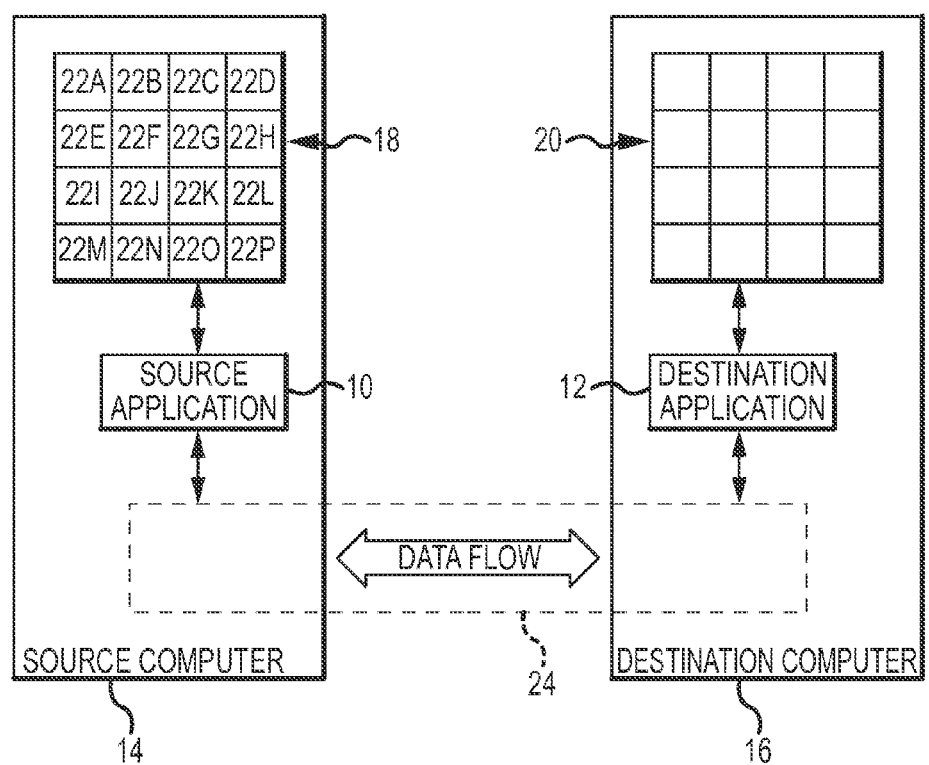

Communication errors between a source computer application ("source application") and a destination computer application ("destination application") which Transmission Control Protocol (TCP) failed to detect are detected and corrected at the application level in an efficient manner.

A source application 10 and a destination application 12 which implement the present invention are shown in FIGS. 1-5. The source application 10 is executed on a source computer 14, and the destination application 12 is executed on a destination computer 16. The applications 10 and 12 coordinate the copying of data from a source disk 18, or other mass storage device of the source computer 14, to a destination disk 20, or other mass storage device of the destination computer 16.

The data on the disk 18 shown in FIG. 1 is collectively represented by data blocks 22A-22P. The data blocks 22A-22P are not necessarily discreet data entities, such as files, but rather represent same size data units that the source application 10 works with, for purposes of transferring the data on the disk 18 to the destination disk 20 of the destination computer 16 in accordance with the present invention. The data blocks 22A-22P may be sized to correspond with a file system unit size, such as a block size of the file system.

The applications 10 and 12 communicate with one another using a communication protocol which includes error detection capabilities, such as the well-known Transport Control Protocol (TCP)/Internet Protocol (IP). A communications flow path 24 represents a conceptual flow of data between the applications 10 and 12. The actual flow of data between the applications 10 and 12 involves an operating system of the source computer 14 placing the data into packets and then sending the packets by TCP/IP over one or more conventional networks (not shown, but represented by the flow path 24). The networks may be either wire based or wireless. The progress of data transfer at select points in time between the applications 10 and 12 which exemplifies the present invention is described below with reference to FIGS. 1-5.

FIG. 1 represents the condition of the disks 18 and 20 at the start of the data transfer. Data blocks 22A-22P represent an entire amount of data stored on source disk 18 that the source application 10 will transfer to the destination application 12 which the destination application will store on the disk 20. The disk 18 of the source computer 14 contains the data to be transferred, represented by the data blocks 22A-22P. The disk 20 of the destination computer 16 is shown as empty, because the data of the data blocks 22A-22P has not yet been transferred.

Figure 2:
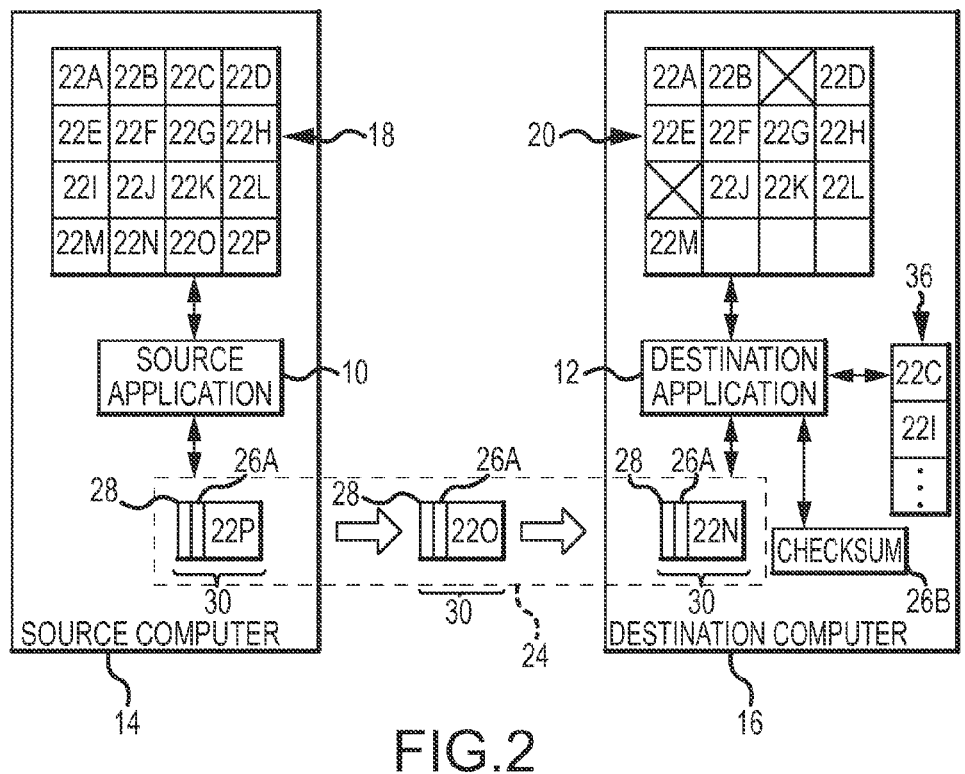

FIG. 2 represents the source application 10 reading the data on the source disk 18 into the separate data blocks 22A-22P, calculating a checksum value 26A for each data block 22A-22P, assigning a different block identifier 28 to each different data block 22A-22P, encapsulating the calculated checksum value 26A and the block identifier 28 with the data of each data block 22A-22P into an equal number of separate padded data blocks (only three such padded data blocks 30 are shown), and sending each padded data block 30 to the destination application 12 in an initial data transfer.

The initial data transfer transmits padded data blocks 30 for each of the data blocks 22A-22P, and sends all such padded data blocks 30 at one time. The block identifiers 28 are unique identifiers that uniquely identify all of the data blocks 22A-22P that constitute the total data structure to be transferred. The block identifiers 28 uniquely identify each individual data block 22A-22P and distinguish it from the others. The applications 10 and 12 rely on the block identifiers 28 to communicate concerning those individual blocks 22A-22P which are transmitted and which must be retransmitted in accordance with the present invention. The block identifiers 28 may correspond to a number or address related to the data blocks 22A-22P as they are stored on disk, such as a unique inode number corresponding to each of the data blocks 22A-22P.

The destination application 12 receives the padded data blocks 30 sent from the source application 10 and extracts the block identifier 28, the checksum value 26A and the data block 22A-22P from each of the padded data blocks 30. The destination application 12 calculates a checksum value 26B (FIG. 2) for each received data block 22A-22P, and compares that calculated checksum value 26B to the received checksum value 26A. If the two checksum values 26A and 26B match one another, the data received by the destination application 12 is highly likely to correspond to and be identical with the data transmitted by the source application 10.

Figure 6:
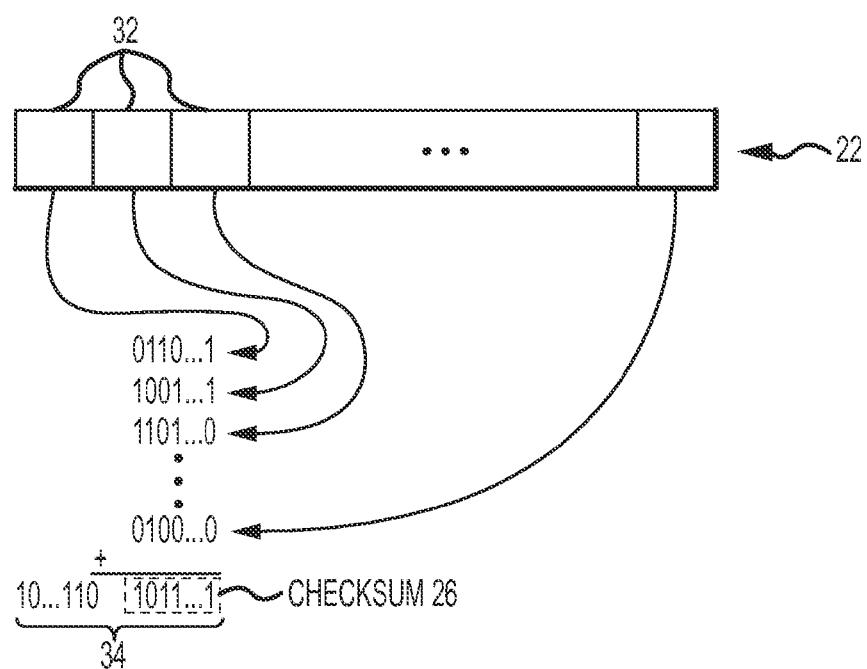
FIG. 6 is a block diagram illustrating the calculation of a checksum in accordance with the graphical representations of FIGS. 1-5.

Both of the applications 10 and 12 use the same checksum algorithm to calculate checksum values 26A and 26B which are used to detect errors. A checksum value is calculated for each data block 22A-22P by the source application 10 before the data block is transmitted, and a checksum value is calculated by the destination application 12 upon receiving the data block. The typical checksum calculation algorithm is shown in FIG. 6. The checksum value is calculated by dividing data, for example a data block 22, into words 32 of fixed length, binarily adding all of the words 32 of the data block together to obtain a sum 34, and then using the least significant word of the sum 34 as the checksum value 26. The checksum value 26A (FIG. 2) represents a checksum calculated by the source application 10 and the checksum value 26B (FIG. 2) represents a checksum calculated by the destination application 12.

For each of the data blocks 22A-22P which have matching checksum values 26A and 26B, the destination application 12 uses the block identifier 28 and the particular data block 22A-22P to write the data block to a data block sized portions of the destination disk 20. Each data block sized portion of the data on the destination disk 20 becomes an identical copy in data content to the block sized portions of the data on the source disk 18. Data blocks 22A-22B, 22D-22H and 22J-22M are shown in FIG. 2 as recorded on the destination disk 20 because the checksum values 26A and 26B for those data blocks matched one another. Data blocks 22N-22P are shown in FIG. 2 as being in the communication flow path 24 and not yet having reached the destination application 12. Data blocks 22N-22P are therefore not shown as recorded in the destination disk 20, because those data blocks 22N-22P have not yet been evaluated by the destination application 12 in accordance with the present invention.

In those cases where the calculated checksum value 26B does not match the received checksum value 26A, the destination application 12 does not write those data blocks with the non-matching checksum values 26A and 26B to the destination disk 20. Instead, the block identifiers 28 associated with the data blocks having the non-matching checksum values 26A and 26B are recorded in a resend list 36. The resend list 36 is used by the destination application 12 to record the block identifiers 28 associated with the data blocks having non-matching checksum values 26A and 26B. The destination application 12 sends the resend list 36 to the source application 10 to inform the source application 10 that certain data blocks were corrupted during transmission and need to be resent. The resend list 36 is shown in FIG. 2 as containing block numbers 22C and 22I, which indicates the checksum values 26A and 26B for the data blocks 22C and 22I did not match. Also, the data blocks 22C and 22I have not been written to the destination disk 20, thereby saving the computational resources that would otherwise be consumed in writing data blocks with erroneous data. Computational throughput is thereby enhanced.

After the destination application 12 has received all of the data blocks 22A-22P in an initial uninterrupted transmission, the destination application 12 sends the block identifiers in the resend list 36 to the source application 10. The source application 10 recognizes the block identifiers as requiring retransmission of the corresponding data blocks. The source application 10 thereafter resends only those data blocks which were not accurately received by the destination application 12.

If the resend list 36 is empty, i.e. does not contain any block identifiers 28, after the destination application 12 has received and processed all of the data blocks 22A-22P, a successful error-free transmission of all data blocks 22A-22P in the initial transmission has occurred. Under these circumstances, the destination application 12 informs the source application 10 that the initial transmission was successful, indicating there is no need for retransmission of any of the data blocks 22A-202P.

Figure 3:
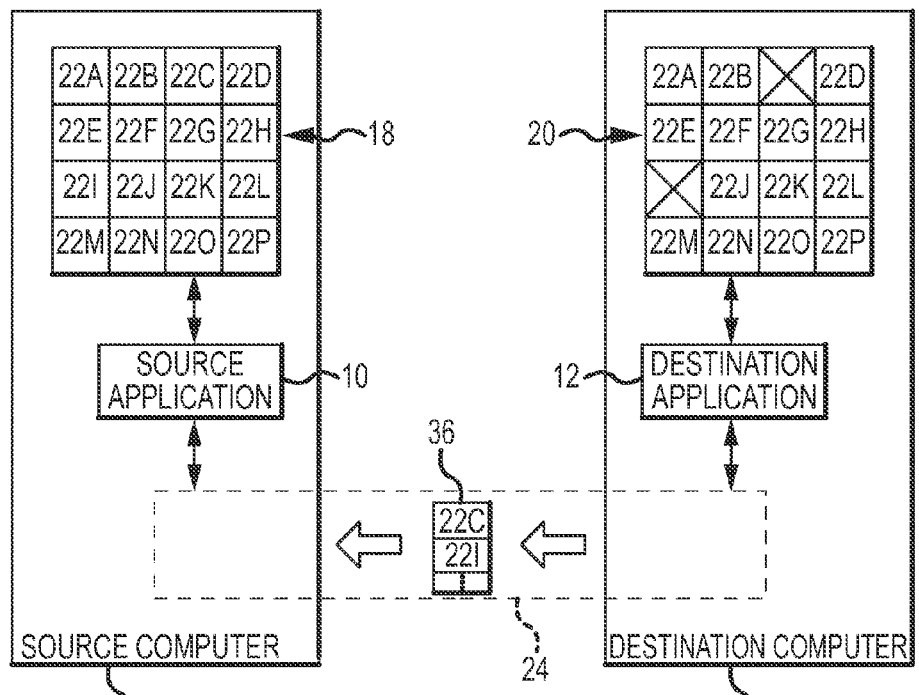

FIG. 3 illustrates the situation where the block identifiers 28 for data blocks 22C and 22I from the resend list 36 are sent to the source application 10. The checksum values 26B calculated for the data blocks 22C and 22I did not match the received checksum value 26A. Sending the block identifiers 28 for the data blocks 22C and 22I is interpreted by the source application 10, when received, as an instruction to retransmit the data blocks 22C and 22I. The destination application 12 clears the resend list 36 after sending a copy of the resend list 36 to the source application 10 in preparation for adding new block identifiers 28 to the resend list 36 during the next data transmission from the source application 10.

The source application 10 receives the block identifiers from resend list 36 and then resends the data blocks 22C and 22I referenced by the block identifiers 28 from the resend list 36, as shown in FIG. 3. Only the data blocks 22C and 22I are resent; the remaining data blocks 22A, 22B, 22D-22H and 22J-22P, are not resent, thereby minimizing the amount of computational resources required for the retransmission and minimizing the amount of time required for the retransmission. This is in contrast to an application which checks the integrity of the body of data after it has been reconstructed from several TCP packets, which would require the entire body of data to be resent when data in any one of the TCP packets is corrupted and unnoticed by TCP.

The source application 10 then resends or retransmits the data blocks 22C and 22I by sending padded data blocks 30 containing data blocks 22C and 22I, as shown in FIG. 4. The destination application 12 extracts the data blocks 22C and 22I, the checksum values 26A, and the block identifiers 28 from the padded data blocks 30. The destination application 12 also calculates a checksum value 26B for both data blocks 22C and 22I, and compares the calculated checksum values 26B for both data blocks 22C and 22I with the received checksum values 26A.

The received and calculated checksum values 26A and 26B are considered to have been matching, as shown in FIG. 5, because the block identifiers for the data blocks 22C and 22I have not been added to the resend list 36. Because the checksum values 26A and 26B of the resent data blocks 22C and 22I matched, the destination application 12 has recorded the data blocks 22C and 22I in the destination disk 20. The data transfer from the source disk 18 to the destination disk 20 is thus completed.

Figure 7:
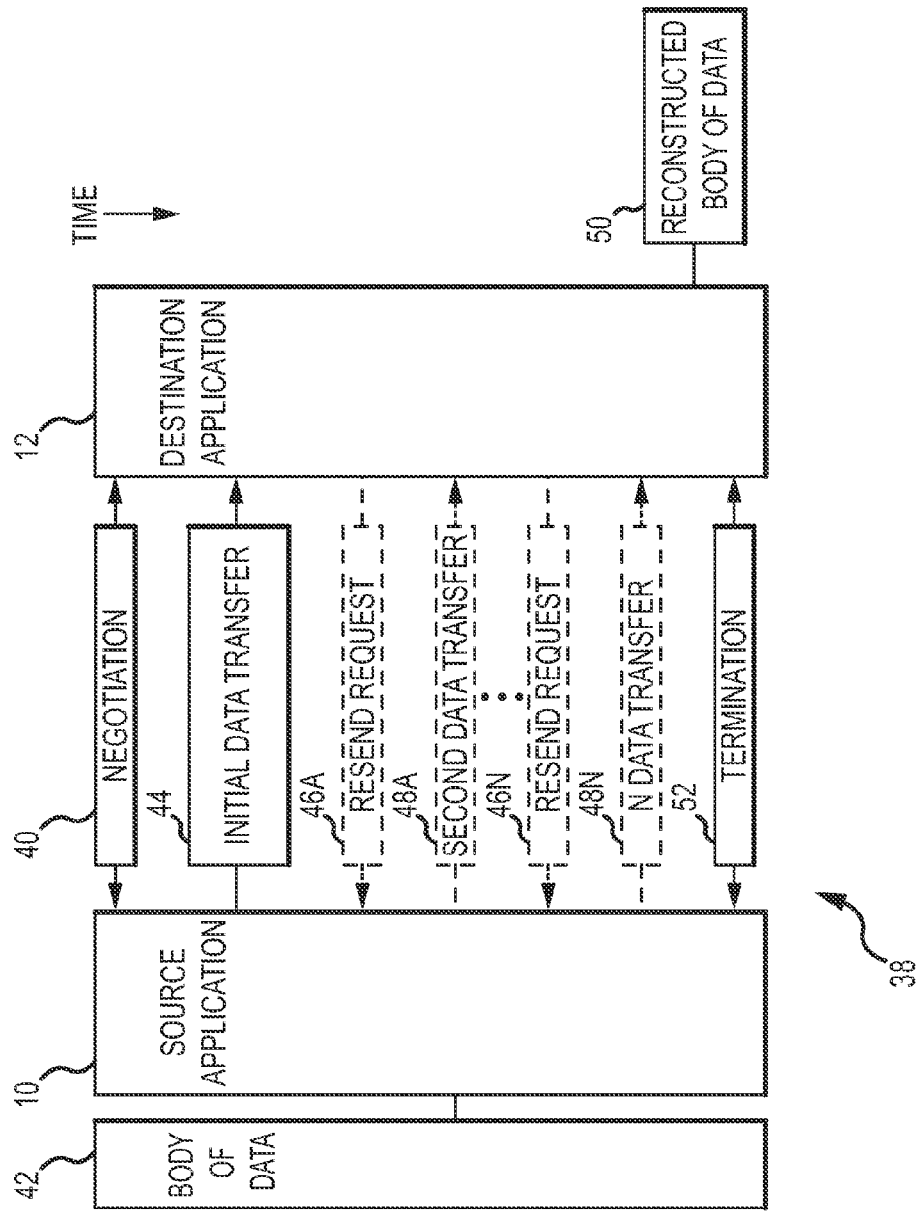
FIG. 7 is a time-event diagram which summarizes the events shown in FIGS. 1-5.

The procedure illustrated graphically in FIGS. 1-5 is summarized in the time event diagram 38 shown in FIG. 7. The time event diagram 38 starts with a negotiation 40 of a communications session. During the negotiation 40, the source application 10 and the destination application 12 agree on what data is to be sent by the source application 10 to the destination application 12. For this communications session, the source application 10 and the destination application 12 agree to transfer a body of data 42 from the source application 10 to the destination application 12. The source application 10 then reads the body of data 42, one data block of data blocks 22A-22P (FIGS. 1-5) at a time, assigns block identifiers 28 (FIG. 2) to the data blocks 22A-22P, computes checksums 26A (FIG. 2) for the data blocks 22A-22P, and sends the data blocks 22A-22P, checksums 26A, and block identifiers 28 as previously described, in an initial data transfer 44.

During the initial data transfer 44, the destination application 12 calculates checksums 26B (FIG. 2) for the data blocks, and compares the calculated checksum 26B with the received checksum 26A for each data block 22A-22P. The destination application 12 adds the block identifiers 28 associated with data blocks 22A-22P having non-matching checksums 26A and 26B, if any, to the resend list 36 (FIG. 2). The destination application 12 also stores those data blocks 22A-22P having matching checksums 26A and 26B on the destination disk 20 (FIGS. 1-5).

The destination application 12 sends the block identifiers 28 associated with the non-matching data blocks 22A-22P in the resend list 36 to the source application 10 in a resend request 46A after the initial data transfer 44 has completed. The source application 10 receives the block identifiers 28 associated with the non-matching data blocks 22A-22P and resends any data blocks 22A-22P identified in the resend list to the destination application 12, along with newly calculated checksums 26A and identifiers 28 for the resent data blocks in a second data transfer 48A.

The destination application 12 and the source application 10 continue the above process of subsequent resend requests 46A-46N and data transfers 48A-48N until the destination application 12 has an accurate copy of each of the data blocks 22A-22P which collectively make up the body of data 42. The destination application 12 uses the accurate copies of the data blocks 22A-22P to create a reconstructed body of data 50, which is a copy of the original body of data 42.

The destination application 12 informs the source application 10 after it has received accurate copies of all of the data blocks 22A-22P, and the two applications 10 and 12 end the communication session in a termination communication 52.

Figure 8:
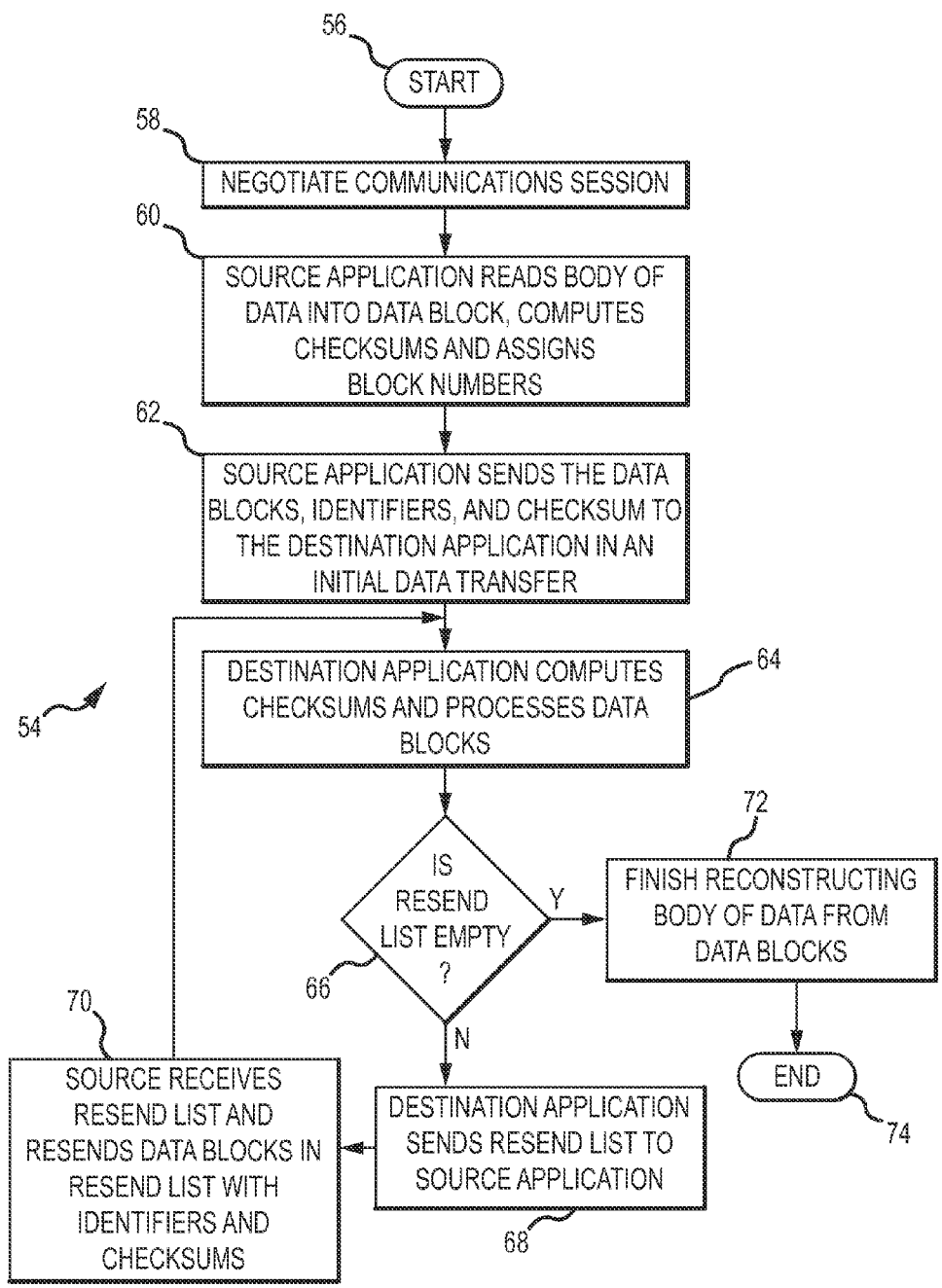
FIG. 8 is a flow chart of events represented by the time event diagram shown in FIG. 7.

A logic flow 54 showing the logic used by the source application 10 and the destination application 12 in implementing the procedure shown in FIGS. 1-7 is shown in FIG. 8. The logic flow 54 starts at 56. At 58, the source application 10 (FIG. 7) and the destination application 12 (FIG. 7) perform the negotiation 40 (FIG. 7) of the communications session and agree on the body of data 42 (FIG. 7) to be sent from the source application 10 to the destination application 12. The source application 10 then, at 60, reads the body of data 42 represented by data blocks 22A-22P (FIG. 1) and associated block identifier 28, computes checksums 26A (FIG. 2) for the data blocks 22A-22P, and assigns block identifiers 28 (FIG. 2) to the data blocks 22A-22P. The source application 10 then sends the data blocks 22, identifiers 28 and checksums 26A to the destination application 12 in the initial data transfer 44 (FIG. 7) at 62. The source application 12 sends the data blocks 22A-22P, identifiers 28, and checksums 26A by combining each of the data blocks 22A-22P with the respective identifier 28 and checksum 26A into a padded data block 30. The source application 10 then makes a system call to the operating system of the source computer 14 to send each of the padded data blocks 30 for each of the data blocks 22A-22P to the destination application using TCP/IP.

At 64, the destination application 12 calculates a checksum 26B (FIG. 2) for each data block 22A-22P received, compares the received checksum 26A with the calculated checksum 26B, stores those data blocks 22A-22P with matching checksums 26A and 26B, and adds the identifiers 28 for those received data blocks 22A-22P with non-matching checksums 26A and 26B to the resend list 36. The destination application 12 then checks to determine if the resend list 36 is empty at 66. If the resend list 36 is empty at this point then the transfer of data blocks 22A-22P is complete. If the resend list 36 is not empty at this point, then another data transfer 48A-48N (FIG. 7) is required. If the determination at 66 is negative, then at 68 the destination application 12 sends the resend list 36 (FIG. 3) to the source application 10. At 70, the source application 10 receives the resend list and resends data blocks 22A-22P associated with identifiers 28 in the resend list to the destination application 12 along with a newly calculated checksum 26A and identifier 28 for each resent data block 22A-22P, in a subsequent data transfer.

The logic flow returns to 64 from 70 and the loop from 64, 66, 68 to 70 is repeated as many times as necessary until the destination application 12 has an accurate copy of all of the data blocks 22A-22P of the original body of data 42 sent by the source application 10.

When the determination at 66 is affirmative, indicating that the destination application 12 has a good copy of all of the data blocks 22A-22P sent by the source application 10, the destination application 12 uses the data blocks 22A-22P to reconstruct the body of data 42 (FIG. 7) at 72. The logic flow ends at 74.

Figure 9:
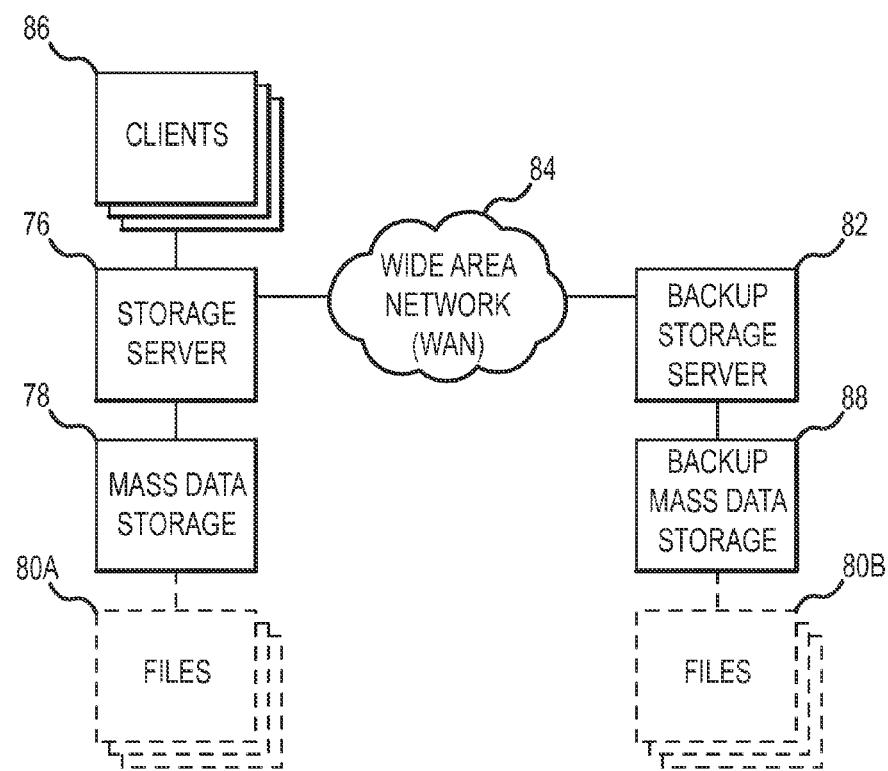
FIG. 9 is a block diagram illustrating the implementation of the present invention in a mass data storage computer system.

The present invention is advantageously incorporated in a mass data storage file system and mass data storage procedure. One example of such incorporation is shown in FIG. 9. A storage server 76 stores files 80A on a mass data storage device 78. The storage server 76 could be a storage server such as those sold by NetApp, Inc. of Sunnyvale, Calif. The storage server 76 is connected to a backup storage server 82 over a wide area network (WAN) 84. Clients 86 access the storage server 76 for file storage services. The use of the storage server 76 for file storage services results in a more efficient allocation of disk storage space among the clients 86 compared to having the clients 86 use only locally attached disk storage. The backup storage server 82 backs up the files 80A stored on the mass data storage device 78 to a backup mass data storage device 88 as files 80B for disaster recovery purposes. The files 80B are copies of the files 80A. The files 80B do not change unless the files 80A change. To backup the files 80A stored on the mass data storage device 78, the storage server 76 sends data in the files 80A to the backup storage server 82 over the wan 84 on a regular basis as the files 80A on the mass data storage device 78 change. The storage server 76 and the backup storage server 82 use the data transfer process previously described between the source application 10 and the destination application 12 in order to transfer data from the storage server 76 to the backup server 82. In this manner, the backup storage server 82 is assured of having an accurate copy of the files 80A stored on the storage server 76.

The present invention offers significant improvements over commonly used application error and correction procedures. Such application error detection and correction procedures usually employ an acknowledgment based retransmission mechanism, in which the source application reads a file or data structure in data block sized units, and sends the data blocks to the destination application for reassembly into a copy of the file or data structure. The destination application sends an acknowledgment to the source application for every data block determined to have been transmitted without errors. The source application resends data blocks when a certain amount of time elapses from having originally sent the data block without receiving an acknowledgment for the data block, or upon receiving a negative acknowledgment indicating that the data block was not successfully received. The source application must buffer the data block until an acknowledgment of successful, error-free receipt is received (or the lack of a negative acknowledgment is received). In the present invention, there is no need to require the source application to buffer sent data in memory while awaiting an acknowledgment or awaiting the failure to receive an acknowledgment. Processing overhead with the present invention is minimized.

The present invention detects errors in the initial transmission of all of the data blocks 22A-22P, and requests retransmission of only those data blocks with non-matching checksum values 26A and 26B at the end of the data transfer, thereby not interrupting the data flow from the initial transmission. The efficiency and performance of the applications 10 and 12 is improved, since the source application 10 reads from the source disk 18 the entire amount of data to be transferred (represented by data blocks 22A-22P) before rereading any data block that needs to be resent.

Sending the initial transmission of data blocks as an integral data transfer maximizes sequential read performance of the source disk 18. The read performance of a disk is greatest when reading contiguous data with minimal movement of the heads, and is conventionally referred to as sequential read performance. Relatively large performance penalties in terms of time delay (compared to data transmission rates) are incurred when heads of the disk must move across the platters to access non-contiguous data. Generally speaking all of the data blocks 22A-22P will be recorded contiguously, or at least each of the individual data blocks will be recorded contiguously, thereby maximizing the amount of sequential read performance obtained both through the initial data transfer and any subsequent retransmissions of specific data blocks.

Although the destination application in the described embodiment may withhold sending the resend requests to the source application until after the source application completes sending the data transfer related to the resend requests, the destination application could alternatively send resend requests to the source application during the data transfer related to the resend request. In this scenario, the resend requests would queue up with the source application and the source application would refrain from responding to the resend requests until the source application completed the current data transfer. In this manner, the sequential read performance of the disks that the source application is reading the data from is still maximized since the queuing of the resend requests by the source application does not interrupt the sequential reading being performed by the disks.

With the destination application 12 tracking errors in the received data blocks 22A-22P in the resend list 36, a quicker data transfer from the source application 10 to the destination application 12 is achieved compared to an acknowledgment based retransmission mechanism. The applications 10 and 12 do not suffer from the additional computational burden of error detection and correction mechanisms using acknowledgments, since the applications 10 and 12 do not need to track and acknowledge data blocks 22A-22P that have been transmitted without errors. Retransmission of a data block at the application level usually involves interrupting the initial data transfer of other data blocks to intersperse resending those data blocks which were not successfully received in an error-free condition.

The source application 10 only executes as many transfers of data blocks to the destination application 12 as necessary for the destination application 12 to have an error-free copy of each of the data blocks. This is in contrast to applications that use TCP/IP to transfer a body of data without first breaking the body of data into smaller data blocks, which requires the body of data to be resent if an error is missed by TCP yet detected by the destination application. The amount of processing overhead required for a successful data transfer is minimized, and the amount of time required to achieve a successful, error-free data transfer is decreased, in the present invention. No additional processing overhead is required in the present invention when there is no data corruption, unlike an acknowledgment based system which at least requires the transmission of the acknowledgments even when the data is received in an error-free condition. In almost all regards, error detection and request for retransmission used in the present invention incurs minimal overhead on the destination and source computers.

Presently preferred embodiments of the present invention and many of its improvements have been described with a degree of particularity. This description is a preferred example of implementing the invention, and is not necessarily intended to limit the scope of the invention. The scope of the invention is defined by the following claims.

What is claimed:

1. A computer system for transferring data from a source application to a destination application using TCP, comprising:
   a source computer which implements TCP, the source computer comprising a source storage medium;
   a destination computer which implements TCP, the destination computer comprising a destination storage medium;
   a source application which executes on the source computer and which accesses the source storage medium;
   a destination application which executes on the destination computer and which accesses the destination storage medium;
   a communications network communicating data between the source computer and the destination computer, the destination computer using TCP checksums to detect some but not all errors introduced into the data by the communications network;
   a body of data stored in the source storage medium, and wherein:
   the source application copies the body of data into a plurality of data blocks, associates a block identifier with each of the data blocks, calculates a source checksum value for each data block, encapsulates each data block with the respective block identifier and source checksum value into a padded data block, and sends to the destination application all of the padded data blocks in an initial data transfer using TCP;
   the destination application receives all of the padded data blocks in the initial data transfer, extracts the data block and the source checksum value and the block identifier from each padded data block, calculates a destination checksum value for each data block, compares the destination checksum value to the source checksum for each data block, stores a first group of data blocks having a source checksum value that matches the destination checksum value on the destination storage medium, identifies a second group of any data blocks having a source checksum value that does not match the destination checksum value and stores the block identifiers of the second group of data blocks in a resend list, and sends to the source application the block identifiers in the resend list after the initial data transfer has completed;
   the source application receives the block identifiers of the resend list and in response recalculates a source checksum value for each data block of the second group, encapsulates each data block of the second group with the respective block identifier and the recalculated source checksum value into a padded data block, and resends to the destination application all of the padded data blocks in a subsequent data transfer using TCP; and
   the checksum values calculated by the source and destination applications are separate from the checksums used by TCP.

2. A computer system as defined in claim 1, wherein:
   the destination application processes each subsequent data transfer in the same manner as the destination application processed the initial data transfer.

3. A computer system as defined in claim 2, wherein:
the destination application sends to the source application a subsequent resend list containing block identifiers associated with data blocks of the second group determined to be corrupted from the subsequent data transfer;
the source and destination applications respond to each subsequent resend list in the manner previously described until the destination application has received an uncorrupted copy of all of the data blocks.

4. A computer system as defined in claim 3, wherein:
the destination application stores each of the data blocks of the first group on the destination storage medium upon receipt to create a copy of the body of data on the destination storage medium.

5. A computer system as defined in claim 4, wherein:
the source application completes data transfers of data blocks to the destination application without interruption from the destination application.

6. A computer system as defined in claim 4, wherein:
the source computer performs a new calculation to determine the checksum for data blocks that the source computer resends to the destination computer.

7. A computer system as defined in claim 2, wherein:
the destination application is a backup application that duplicates files stored on the source storage medium onto the destination storage medium.

8. A computer system as defined in claim 2, wherein:
the destination application does not acknowledge to the source application the receipt of data blocks having matching checksums.

9. A computer system as defined in claim 2, wherein:
the source application does not buffer in memory the data blocks the source application sends to the destination application.

10. A method of detecting and correcting data errors arising from communicating a body of data through a network communications flow path between a source computer executing a source application and a destination computer executing a destination application, the source and destination computers utilizing an implementation of TCP to communicate over the network communications flow path, at least some of the data errors going undetected by TCP, comprising:
reading a body of data into data blocks, by the source application;
calculating a source checksum value for each data block, by the source application;
associating a block identifier with each data block, by the source application, wherein the block identifier uniquely identifies the data block;
encapsulating each data block, calculated checksum, and associated block identifier into a padded data block;
sending the padded data blocks to the destination application over the network communications flow path, by the source application;
receiving the padded data blocks from the source application over the network communications flow path, by the destination application;
extracting the data block, calculated checksum and associated block identifier from each received padded data block, by the destination application;
using the extracted data block to calculate a destination checksum value for each extracted data block, by the destination application;
comparing the source checksum value to the destination checksum value for each data block extracted, by the destination application;
determining by the destination application a data block to be corrupted if the source checksum value of each data block does not match the destination checksum value of the data block, by the destination application;
requesting the source application to resend corrupted data blocks, the resend occurring after the destination application has received all of the data blocks, the requesting occurring by sending to the source application block identifiers associated with the corrupted data blocks, by the destination application;
resending any data blocks requested to be resent with checksum values and with block identifiers in padded data blocks, by the source application; and
wherein the calculated source and destination checksum values are separate from any checksums used by TCP.

11. A method as defined in claim 10, wherein:
the requesting and resending are repeated until all of the data blocks received by the destination application have matching checksums.

12. A method as defined in claim 11, further comprising:
storing a data block when the source checksum value matches the destination checksum value, by the destination application; and
creating a copy of the body of data from the stored data blocks by the destination application.

13. A method as defined in claim 12, further comprising:
associating a block identifier with each data block by reading an identifier associated with the data block from a file system which contains the data block.

14. A method as defined in claim 12, further comprising:
accomplishing the sending and resending by the source application without interruption from the destination application.

15. A method as defined in claim 12, further comprising:
calculating new checksum values for the data blocks being resent by the source application in response to a request to resend the data block by the destination application.

16. A method as defined in claim 12, further comprising:
the requests to resend data blocks by the destination application to the source application is performed in a single communication after all of the data blocks sent to the destination application by the source application have been received by the destination application.

17. A computer system for transferring data from a first storage server over a communication network to a second storage server, comprising:
a first storage server comprising a first storage medium;
a second storage server comprising a second storage medium;
a communications network for communicating data between the first and second storage servers;
a body of data stored in the first storage medium, and wherein:
the first storage server reads portions of the body of data until the body of data is read, calculates a checksum for each of the portions, and sends all of the portions along with calculated checksums to the second storage server using TCP/IP;
the second storage server receives all of the portions and calculated checksums, calculates a second checksum value for each portion, compares the received checksum to the second checksum for each portion, and communicates to the first storage server a resend request for any of the portions when any of the portions have received checksums and second checksums which do not match;
the first storage server receives the resend request and resends the requested portions with calculated checksums using TCP/IP to the second storage server after all of the portions have been sent to the second storage server at least once; and the second storage server receives the resent portions and calculated checksums, calculates a second checksum for each received portion, and reconstructs the body of data onto the second storage medium after the received and second checksums match for every portion of the body of data.

18. A computer system as defined in claim 17, the second storage server further comprising:

a memory unit for storing data, and wherein:

the first storage server sends a unique identifier associated with each of the portions with each portion when the first storage server sends each of the portions to the second storage server;

the second storage server stores the identifier associated with portions having non-matching received and second checksums in the memory unit, the second storage server reads the identifiers from the memory unit and includes the identifiers in the resend request to the first storage server; and the first storage server receives the identifiers in the resent request and uses the identifiers to correctly identify the portions requested to be resent in the resend request.

19. A computer system as defined in claim 18, wherein:

the second storage server does not send the resend request to the first storage server until the all of the portions sent by the first storage server have been received by the second storage server.

* * * * *